Nov. 22, 1960    E. W. AYLOR    2,961,115
CHAIN GUARDS FOR POULTRY COOPS AND THE LIKE
Filed April 7, 1959

INVENTOR
Eugene W. Aylor
BY Mason, Fenwick & Lawrence
ATTORNEYS

United States Patent Office 2,961,115
Patented Nov. 22, 1960

2,961,115

CHAIN GUARDS FOR POULTRY COOPS AND THE LIKE

Eugene W. Aylor, Brightwood, Va.

Filed Apr. 7, 1959, Ser. No. 804,703

5 Claims. (Cl. 217—69)

The present invention relates in general to top side frame guards for poultry coops and the like to protect them against being damaged by chains, metallic cables, or like fastening devices commonly employed to fasten a number of poultry coops in stacked relation on trucks.

Commercial poultry coops for transporting poultry are usually made of wood, this being the most economical and generally desirable construction material for this type of container. In the transportation of wood poultry coops, it is common practice to stack the coops on vehicles such as trucks, and to secure the coops in stacked relation by means of chains or cables drawn tightly over the group of stacked poultry coops. Ordinarily, the chains or cables have direct contact with the outermost top side frame of the uppermost poultry coop in the vertical stacks of coops along the lateral edges of the truck bed. While this is not particularly harmful to the lower coops in the stacks of coops, the chains or cables frequently produce rapid destruction of the outerside frames of the coops in immediate contact with the chains of cables due to the wear of the chain links on the top side rails when the chains or cables are drawn over the rails to fasten the coops and due to the crushing effect of the chains or cables against the top side rails during transportation. This rapid deterioration of the wooden poultry coops is particularly serious at the places along the corners of the top side rails where the chains or cables must change direction. Such damage to the coops requires rapid replacement.

Accordingly, an object of the present invention is to provide a guard for the top side frames of wooden poultry coops and the like which will permit securing of stacks of the poultry coops on a truck bed or the like by chains or cables in the usual manner, and which will serve effectively to protect the coops against damage by the fastening means.

Another object of the present invention is the provision of a guard for the outer top side frames of poultry coops in a stack of coops which will protect the side frames against damage by fastening chains or cables when the coops are bound into a group of coops for transportation, which guards are provided with means to restrict displacement of the guards along the coop side frames and to restrict displacement of the fastening chains or cables along the load.

Another object of the present invention is to provide a chain guard for protecting the side rails of wooden poultry coops from destruction or damage by fastening chains, which is simple in construction, inexpensive to manufacture, and which may be readily assembled with standard wooden poultry coops.

Other objects advantages and capabilities of the present invention will become apparent from the following detailed description, taken in conjunction with the accompanying drawing illustrating several preferred forms of the invention.

Figure 1:
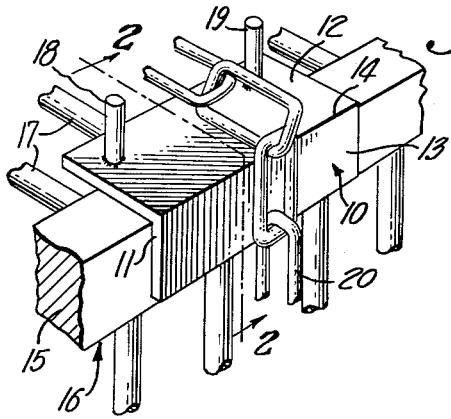
Figure 1 is a perspective view of one form of chain guard for the top side frames of poultry coops, embodying the present invention, illustrating the chain guard in assembled position on a portion of a poultry coop.
Figure 2:
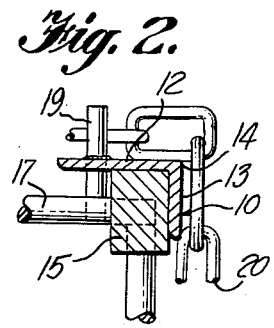
Figure 2 is a vertical transverse section view of the chain guard illustrated in Figure 1, taken along the lines 2—2 of Figure 1.

Referring to the drawing, wherein like reference characters designate corresponding parts throughout the several figures, and particularly to Figures 1 and 2, the chain guard of the present invention, one form of which is shown in Figures 1 and 2 and indicated generally by the reference character 10, comprises a body portion 11 having a pair of right angular related flanges 12, 13 joined at the corner 14 which may conveniently be formed of a length of angle iron or the like. The flanges 12, 13 are designed to conform to and embrace the top and outer side surfaces of a top side flange or rail 15 of a wooden poultry coop 16. In one specific embodiment, the top flange 12 is a horizontal inwardly projecting flange which extends from the corner 14 a greater distance than the width of the top surface of the side frame 15 to provide an inwardly projecting terminal extension which overlies the dowels 17 forming the top of the poultry coop, and the flange 13 is a vertically depending flange which extends from the corner 14 a distance corresponding substantially to the height of the outer side surface of the side frame 15. The upper, inwardly projecting horizontal flange 12 supports a pair of rigid pins, studs or rod sections 18, 19 projecting both above and below the flange 12. These pins 18, 19 may be conveniently secured to the flange 12 by projecting them through complementary openings formed in the flange 12 until they are substantially centered longitudinally of the pins 18, 19 in the openings and then welding the same to the flange 12. The portions of the pins 18, 19 projecting above the upper flange 12 define, with the upper surface of the flange 12, an upwardly opening channel shaped recess for reception of the fastening chain 20 therebetween to limit displacement of the chain longitudinally of the flange 12, and the portions of the pins 18, 19 project below the flange 12 a sufficient distance to interfit between the dowels 17 forming the top of the coop. In the specific embodiment illustrated in Figures 1 and 2, the pins 18, 19 are spaced apart longitudinally of the angle iron body portion 11 a sufficient distance to embrace two dowels 17 therebetween, although it will be understood that the spacing may be such as to embrace only one dowel 17 or more than two dowels 17.

In the use of the chain guard 10, it will be apparent that one of such chain guards should be fitted over the top side frame 15 located nearest the lateral edge of the truck bed for the uppermost poultry coop of each stack of coops. The interfitting of the depending portions of the pins 18, 19 between adjacent pairs of dowels 17 forming the top of the associated poultry coop serve as locator means to restrict displacement of the chain guard 10 longitudinally of the side frame 15 within the limits determined by the spacing between adjacent dowels 17 and the spacing of the pins 18, 19 relative thereto. Similar chain guards 10 may be provided on the forwardly disposed top end frame and the rearwardly disposed top end frame of the uppermost coops at the front and rear of the load, respectively. Chains 20 are then drawn over the chain guards 10 between the upwardly projecting portions of the pins 18, 19 and bound to fasten the load securely on the truck bed. The angle iron body 11 of the chain guard 10 receives all of the wear from the chain links and protects the top side frames against damage, while the pins 18, 19 serve to restrict displacement of both the chain guard 10 relative to the coop and of the chain 20 relative to the chain guard 10.

Figure 3:
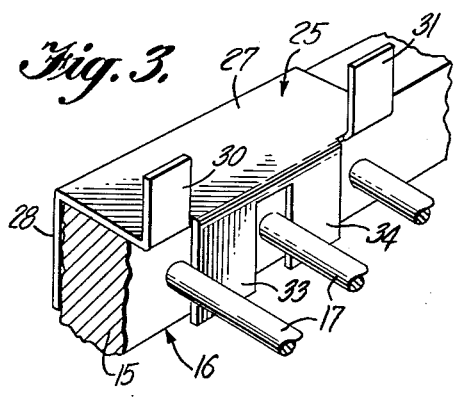
Figure 3 is a perspective view of a second preferred form of chain guard embodying the present invention, illustrated in assembled relation with a portion of a poultry coop.
Figure 4:
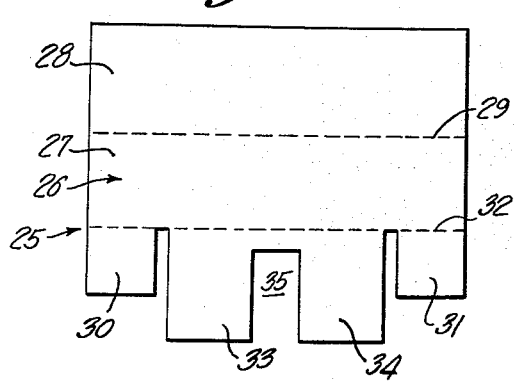
Figure 4 is a plan view of the blank from which the chain guard of Figure 3 is formed.

Figures 3 and 4 disclose a modified construction for a chain guard, indicated here by the reference character 25, which is adapted to be associated with the top side frame 15 of the poultry coop 16 in a manner similar to that of the chain guard 10. The chain guard 25, however, is produced from a blank of sheet metal, indicated by the reference character 26 in Figure 4, which comprises a rectangular top panel 27 adapted to form the upper horizontal flange of the guard plate 25, a rectangular panel 28 disposed laterally alongside the rectangular panel 27 and adapted to be bent at right angles thereto along the axis indicated by the broken line 29 to form a depending vertical flange adapted to lie alongside the outer side surface of the top side frame 15. It will be recognized that the panels 27 and 28 correspond generally to the flanges 12 and 13 respectively of the angle iron body portion 11 of the chain guard 10. The blank 26 also contains a pair of shorter rectangular extensions 30 and 31 extending from the lateral edge of the panel 27 indicated by the broken line 32 opposite the panel 28 and located at the opposite ends of the edge 32, which are designed to be bent upwardly at right angles to the plane of the panel 27 to form upstanding formations defining an upwardly opening U-shaped recess therebetween for reception of the chain 20 and to limit displacement of the chain 20 longitudinally of the chain guard 25 and top side frame 15. Additional longer rectangular extensions 33 and 34 also extend from the edge 32 of the panel 27 between the shorter extensions 30 and 31, which extensions 33 and 34 are to be bent downwardly at right angles to the plane of the panel 27. The longer extensions 33, 34 are spaced apart to provide an opening 35 thereby of slightly greater width of the diameter of one of the dowels 17 to receive a dowel 17 therebetween whereby the extensions 33, 34 flank the dowel 17 and limit displacement of the chain guard 25 longitudinally of the top side frame 15. The extensions 33, 34, when deformed into a plane paralleling the plane of the depending vertical flange formed by the panel 28, define a downwardly opening channel with the panel 28 having a width which will just accommodate the width of the top side frame 15 of standard poultry coops, although it will be appreciated that the extensions 33, 34 may be spaced a further distance from the panel 28 to adapt the chain guard 25 to substantial variations in the width of the top side frame 15.

Figure 5:
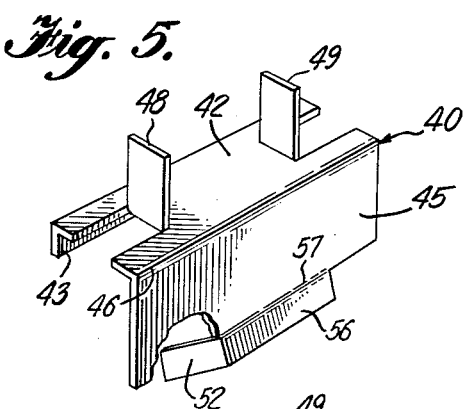
Figure 5 is a perspective view of a third form of chain guard for poultry coops, embodying the present invention.
Figure 6:
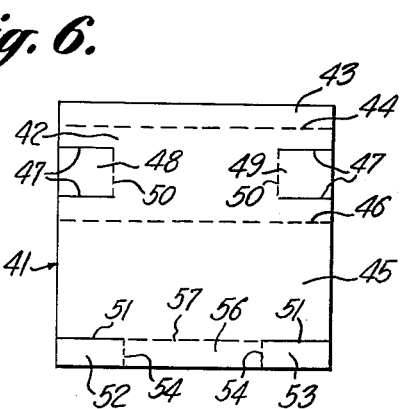
Figure 6 is a plan view of the blank from which the chain guard of Figure 5 may be formed.
Figure 7:
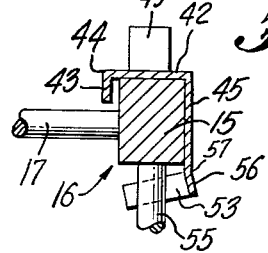
Figure 7 is a vertical transverse section view of the chain guard illustrated in Figure 5, shown in position on the top side rail of a poultry coop.

Figures 5, 6 and 7 show a still further modification, wherein the chain guard 40 is formed of a rectangular blank 41 of sheet metal having a rectangular panel 42 forming the upper horizontal flange of the guard plate 40 adapted to overlie the top surface of the top side frame 15, a rectangular lip panel 43 adapted to be bent downwardly at right angles to the plane of the panel 42 along the broken line 44 to lap the upper portion of the inner side surface of the top side frame 15, and a rectangular panel 45 adapted to be bent downwardly at right angles to the plane of the panel 42 along the broken line 46 to form the depending vertical flange of the chain guard 40. The panel 42 is provided at the opposite ends thereof with laterally spaced cuts 47 extending inwardly from the end edges of the panel 42 to define rectangular formations 48, 49 which are to be bent upwardly about the broken lines 50 and defining an upwardly opening U-shaped recess with the panel 42 for reception of the chain 20 and for limiting displacement thereof longitudinally of the chain guard 40.

At the lower edge of the panel 45 opposite the edge 46 thereof, cuts 51 extend inwardly from the end edges of the panel 45 in parallelism with the edge 46 thereof to form rectangular arms 52, 53 to be bent inwardly along the broken lines 54 to form inwardly projecting arms adapted to extend between a pair of the dowels 55 forming a side of the poultry coop 16. The arms 52 and 53 may be spaced apart a distance sufficient to accommodate one, two or more dowels 55 to restrain movement of the chain guard 40 longitudinally of the top side frame 15. To facilitate assembly of the chain guard 40 on to the top side frame 15, the rectangular portion 56 of the blank 41 lying between the bend lines 54 is bent at a slight angle outwardly of the plane of the panel 45 along the broken line 57 to incline the arms 52, 53 downwardly from the horizontal and provide a sufficient space between the free ends of the arms 52, 53 and the free edge of the flange 43 to accommodate the top side frame 15 therebetween.

It will be appreciated that each of the embodiments specifically described above will be mounted on the top side frame 15 at the outer side of the uppermost poultry coop in each stack of coops or in selected stacks of coops, and the binding chains 20 drawn thereover and disposed between the pins 18, 19, or the extensions 30, 31 or 48, 49. The various forms of chain guards herein disclosed will be maintained against undesired displacement along the associated chicken coops and will restrict displacement of the binding chains to always maintain the chain links in contact with the metallic flanges of the chain guards to prevent wear and destruction of the wooden poultry coops.

While several specific embodiments of the present invention have been particularly shown and described, it is apparent that other modifications may be made in the invention without departing from the spirit and scope thereof, and it is desired therefore, that only such limitations shall be placed thereon as are embodied by the prior art and are set forth in the appended claims.

What is claimed is:

1. A chain guard for poultry coops of the type having side frame rails of rectangular cross section at each side thereof and spaced parallel dowels extending between the side frame rails, the chain guard being adapted to shield the side frame rails against contact with fastening chains and the like used to bind a plurality of such coops in stacked fashion into a load for transportation and protect the side frame rails against damage from the fastening chains, the chain guard comprising an elongated body portion having a vertical depending flange and a horizontal flange lying at right angles to each other adapted to overlie and abut the outer side and top surfaces of one of the side frame rails of the uppermost coop in a stack of coops, one of said flanges projecting from its juncture with the other flange a distance greater than the width of the adjacent surface of the associated side frame rail providing a terminal zone along the free edge of said one of said flanges which projects inwardly beyond the associated side frame rail and overlies a dowel portion of the coop, first projecting members extending from said terminal zone in the direction of extension of said other flange a sufficient distance to project between pairs of said dowels and spaced apart longitudinally of said body portion to interfit between different pairs of dowels and flank at least one of the dowels, and chain limiting arms projecting outwardly from one of said flanges forming a channel shaped recess with their associated flange to receive a binding chain therein and limit displacement of the binding chain longitudinally of said body portion.

2. A chain guard for poultry coops of the type having top side frame rails of rectangular cross section at each side thereof and spaced parallel dowels extending horizontally between the top side frame rails, the chain guard being adapted to shield the top side frame rails against contact with fastening chains and the like used to bind a plurality of such coops in stacked fashion into a load for transportation and protect the top side frame rails against damage from the fastening chains, the chain guard comprising an elongated right angular body portion having a vertical depending flange and a horizontal flange adapted to overlie and abut the outer side and top surfaces of the top side frame rail of the uppermost coop in a stack of coops, the horizontal flange projecting inwardly of the coop from its juncture with the vertical flange a distance greater than the width of the top surface of the top side frame rail providing a terminal zone along the free edge of said horizontal flange which projects inwardly beyond the top side frame rail and extends over portions of a plurality of said dowels, guard locating members extending downwardly from said terminal zone of said horizontal flange a sufficient distance to project between pairs of said dowels and spaced apart longitudinally of said body portion to interfit between pairs of the dowels and embrace at least one of the dowels therebetween to limit horizontal displacement of said guard both longitudinally and transversely of the top side frame rail, and chain restricting members projecting upwardly from said horizontal flange and spaced longitudinally of said body portion forming an upwardly opening channel shaped recess with said horizontal flange to receive a fastening chain therebetween and limit displacement of said fastening chain longitudinally of the guard.

3. The combination recited in claim 2, wherein said body portion is formed from a length of angle iron having a pair of longitudinally spaced apertures in the horizontal flange thereof located near the free edge of the horizontal flange, and wherein said guard locating members and said chain restricting members are formed of rigid lengths of rod stock disposed with their longitudinal centers substantially in said apertures in said horizontal flange and welded to said horizontal flange whereby each length of rod stock has a portion depending below said horizontal flange forming a guard locating member and a portion projecting above the horizontal flange forming a chain restricting member.

4. A chain guard for poultry coops of the type having top side frame rails of rectangular cross section at each side thereof and spaced parallel dowels extending horizontally between the top side frame rails, the chain guard being adapted to shield the top side frame rails against contact with fastening chains and the like used to bind a plurality of such coops in stacked fashion into a load for transportation and protect the top side frame rails against damage from the fastening chains, the chain guard comprising a blank of sheet metal having a first rectangular panel and a second rectangular panel bent at right angles to said first panel and joined thereto along one lateral edge to form a vertical depending flange and a horizontal flange adapted to overlie and abut the outer side and top surfaces of the top side frame rail of the uppermost coop in a stack of coops, a pair of shorter rectangular tabs located at the opposite ends of and projecting from the lateral edge of said second rectangular panel opposite the edge thereof joined to said first panel, said shorter rectangular tabs being bent perpendicular to said second panel in a direction opposite the direction of projection of said first panel therefrom to form upstanding arms defining therebetween an upwardly opening channel shaped recess to receive and restrict movement of a binding chain longitudinally of the top side frame rail, and a pair of longer rectangular tabs projecting from said lateral edge of said second panel and located intermediate said shorter tabs, said longer tabs being spaced apart to define an opening therebetween of sufficient width to accommodate at least one of said dowels, said longer tabs being bent downwardly at right angles to said second panel in the direction of projection of said first panel and being of sufficient length to extend between different pairs of said dowels to restrict horizontal movement of said chain guard longitudinally and transversely of the top side frame rail.

5. A chain guard for poultry coops of the type having top and bottom side frame rails of rectangular cross section at each side thereof and spaced parallel dowels extending vertically between the top and bottom side frame rails at each side thereof, the chain guard being adapted to shield the top side frame rails against contact with fastening chains and the like used to bind a plurality of such coops in stacked fashion into a load for transportation and protect the top side frame rails against damage from the fastening chains, the chain guard comprising a blank of sheet metal having first and second adjacent rectangular channels bent at right angles to each other to form a vertical depending flange and a horizontal flange adapted to overlie and abut the outer side and top surface of the top side frame rail of the uppermost coop in a stack of coops, said second panel having a pair of laterally spaced parallel cuts extending inwardly from each end edge thereof and upwardly bent tabs formed of the material lying between the pair of cuts at each end edge of said second panel which are bent upwardly into perpendicular relation to said second panel to define an upwardly opening channel shaped recess to receive therebetween and restrict movement of a fastening chain, a third rectangular panel joined to the lateral edge of said first panel opposite the juncture of said first panel with said second panel, said third rectangular panel being bent outwardly at an angle to the plane of said first panel and having downwardly and inwardly projecting end tabs bent at right angles to said third panel and of sufficient length to extend between different pairs of said vertically extending dowels and embrace at least one of said dowels therebetween to restrict movement of said chain guard longitudinally of the top side frame rail.

References Cited in the file of this patent

UNITED STATES PATENTS 2,160,235     Slusar _____ May 30, 1939